United States Patent
Tang et al.

(10) Patent No.: US 10,944,579 B2
(45) Date of Patent: Mar. 9, 2021

(54) DEVICE PAIRING AND AUTHENTICATION

(71) Applicant: Combined Conditional Access Development and Support, LLC, Philadelphia, PA (US)

(72) Inventors: Lawrence W. Tang, San Diego, CA (US); Douglas M. Petty, San Diego, CA (US)

(73) Assignee: Combined Conditional Access Development and Support, LLC, Philadelphia, PA (US)

( * ) Notice: Subject to any disclaimer, the term of this patent is extended or adjusted under 35 U.S.C. 154(b) by 499 days.

(21) Appl. No.: 15/606,511

(22) Filed: May 26, 2017

(65) Prior Publication Data

US 2018/0343250 A1 Nov. 29, 2018

(51) Int. Cl.
*H04L 9/32* (2006.01)
*H04L 29/06* (2006.01)
*H04L 9/08* (2006.01)
*H04W 12/06* (2021.01)
*H04W 12/00* (2021.01)

(52) U.S. Cl.
CPC .......... *H04L 9/3271* (2013.01); *H04L 9/0872* (2013.01); *H04L 63/123* (2013.01); *H04W 12/00502* (2019.01); *H04W 12/0605* (2019.01); *G06F 2221/2103* (2013.01); *H04L 63/0876* (2013.01); *H04W 12/003* (2019.01)

(58) Field of Classification Search
CPC . H04L 9/3271; H04L 63/123; H04L 63/0876; H04W 12/003; G06F 2221/2103
See application file for complete search history.

(56) References Cited

U.S. PATENT DOCUMENTS

| | | | | |
|---|---|---|---|---|
| 6,088,450 | A * | 7/2000 | Davis | G06F 21/35 713/182 |
| 8,848,905 | B1 * | 9/2014 | Hamlet | H04K 1/04 380/35 |
| 9,154,480 | B1 * | 10/2015 | Juels | H04L 63/08 |
| 2003/0204743 | A1 * | 10/2003 | Devadas | G06F 21/31 726/9 |
| 2008/0159534 | A1 * | 7/2008 | Rager | G06F 21/31 380/247 |
| 2009/0270036 | A1 * | 10/2009 | Michaud | H04W 12/06 455/41.3 |
| 2010/0042838 | A1 * | 2/2010 | Ho | H04L 9/0844 713/169 |

(Continued)

*Primary Examiner* — Robert B Leung
(74) *Attorney, Agent, or Firm* — BakerHostetler

(57) ABSTRACT

Methods for system component pairing and authentication are described. A first system component may pair with a second system component in response to receiving a unique identifier from the second system component. The first system component may store the received unique identifier and, thereafter, may authenticate that it is, in fact, communicating with the second system component. The first component may communicate a challenge message directed to the second system component and if the contents of the reply message and the time taken to receive the reply message do not correspond to expected values, the first component may determine that it may not be communicating with the intended second component and may cease communications with the second component.

24 Claims, 7 Drawing Sheets

(56) References Cited

U.S. PATENT DOCUMENTS

| | | | |
|---|---|---|---|
| 2010/0250936 A1* | 9/2010 | Kusakawa | H04L 9/3278 713/169 |
| 2011/0107092 A1* | 5/2011 | Krig | H04L 9/3271 713/168 |
| 2013/0047209 A1* | 2/2013 | Satoh | H04L 9/3278 726/2 |
| 2013/0347067 A1* | 12/2013 | Li | G06F 21/31 726/3 |
| 2014/0327469 A1* | 11/2014 | Pfeiffer | H03K 19/003 326/8 |
| 2016/0207323 A1* | 7/2016 | Ward | G06F 21/445 |
| 2017/0163607 A1* | 6/2017 | Skuratovich | H04L 63/0428 |

* cited by examiner

DEVICE PAIRING AND AUTHENTICATION

BACKGROUND

Systems typically comprise components that are designed to interact with each other in order to perform particular tasks. For example, a processor component may be configured to interact with a configurable device that has been configured to perform particular tasks in response to requests from the processor. In many instances, the tasks performed by system components are generic and little or no processing is devoted to ensuring the identity of particular components. In systems that are directed to performing sensitive operations, there is often an interest in confirming that a component with which communication is being performed and that is relied upon to perform sensitive operations, is, in fact, the intended component.

SUMMARY

Systems and methods are described for pairing and authenticating system components. A first system component may pair with a second system component in response to receiving a unique identifier from the second system component. For example, the first system component, which may be a processor device, may receive a unique identifier from a second system component, which may be a programmable device component. The first system component forms a pairing with the second computing device by storing the received unique identifier. The first system component may thereafter anticipate communicating with the second system component and may perform processing to authenticate that it is, in fact, communicating with the second system component.

The first system component may generate and communicate a series of challenge messages to the second system component. Each challenge message may comprise data that is suitable to be operated on by a cryptographic function. Responsive to a received challenge message, the second system component may generate and transmits a reply message comprising a processing result. The first system component may store a reply message including the processing result in relation to the corresponding challenge message. The first system component calculates and stores in relation to the challenge message a time value corresponding to the length of time between when the particular challenge message was sent and the corresponding reply message was received.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Electronic system components or devices are sometimes employed in the processing of sensitive data. For example, in a system that delivers encrypted digital content and/or that enforces digital rights management, components of the system are called on to process and communicate data that needs to be maintained securely. A processor device may communicate with and rely upon a separate programmable device to perform processing on data in a secure manner. The processor device needs confirmation that the device it is communicating with and relying upon to process the data in a secure manner is, in fact, the intended programmable device.

Systems and methods are described for pairing and authenticating system components. A first system component may form a pairing with a second system component in response to receiving a unique identifier from the second system component. The first system component, which may be a processor device, may store the received unique identifier and, thereafter, may authenticate that it is, in fact, communicating with the second system component. For example, the first component may communicate a challenge message directed to the second system component and if the contents of the reply message and the time taken to receive the reply message do not correspond to expected values, the first component may determine that it may not be communicating with the intended second component and may cease communications with the second component.

Figure 1A:
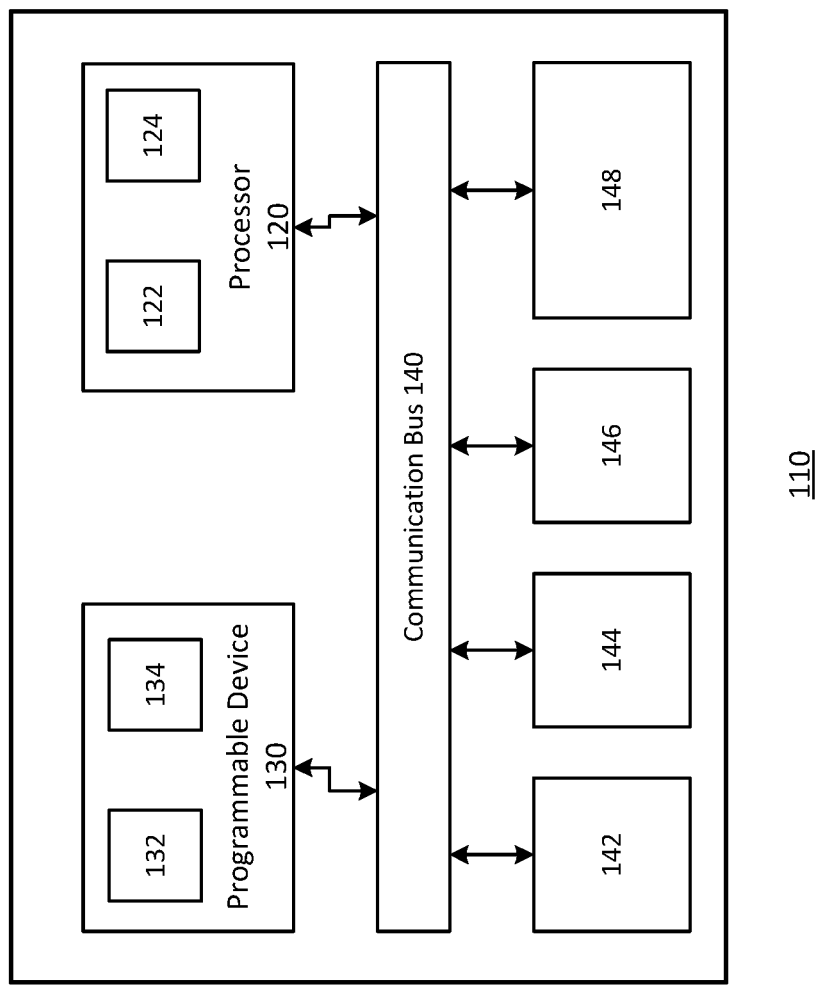
FIG. 1A depicts an example computing environment.

FIG. 1A depicts an example computing system 110, such as a computing system suitable for system component pairing and authentication processing. The system 110 and the components therein may be configured to provide any of numerous different functions. For example, the system 110 may be comprised in a content distribution network and may be configured to process encrypted digital content and/or to enforce digital rights management. The computing system 110 may comprise a plurality of components 120, 130, 140, 142, 144, 146, and 148 that are communicatively coupled and configured to provide the desired functionality. The components may be any that are suitable to perform the desired or intended functionality. For example, components 142, 144, 146, and 148 may be memory devices, processors, and/or controllers that are configured to perform desired functions. Any of the components, such as component 146 shown in FIG. 1A, may be configured to act as an external communication module to communicate with external memory, such as cloud storage 150.

The system component 120 may be a processor component or device that is configured to perform a sensitive or secure function. The processor component 120 may comprise a processing unit 122 and a memory unit 124 for performing the processing. The processor component 120 may be designed to perform in a secure manner and may be, for example, a smart card chip that provides security protection mechanisms. The processor component 120 may be a smart card chip device such as those manufactured, for example, by Infineon, NXP, Morpho, Gemalto, or any other providers.

The system component 130 may be a programmable device that is configured to perform various functions in response to communications from the processor component 120 as well as communications from the external bus 152. The programmable device 130 may comprise a processing unit 132 and a memory unit 134 for performing the desired processing. In an example embodiment, the programmable device 130 may be a field-programmable gate array (FPGA) array device that may be configured to perform a desired set of functions. For example, the programmable device 130 may be an FPGA device such as those manufactured by Altera, Atmel, Achnonix, or other providers.

The processor device 120 may be communicatively linked to programmable device 130 via a communication link 140. Communication link 140 may have any configuration suitable for communicating commands and data between components. For example, communication link 140 may be a communication bus suitable to allow communications between the devices comprised in system 110, as well as to external devices via external link 152.

The processor device 120 may communicate with and may rely upon the programmable device 130 to perform processing on data in a secure manner. Accordingly, the processor device 120 may be configured to pair with the programmable device 130 and periodically authenticate that it is, in fact, communicating with and relying on the processing of the intended programmable device 130.

Figure 1B:
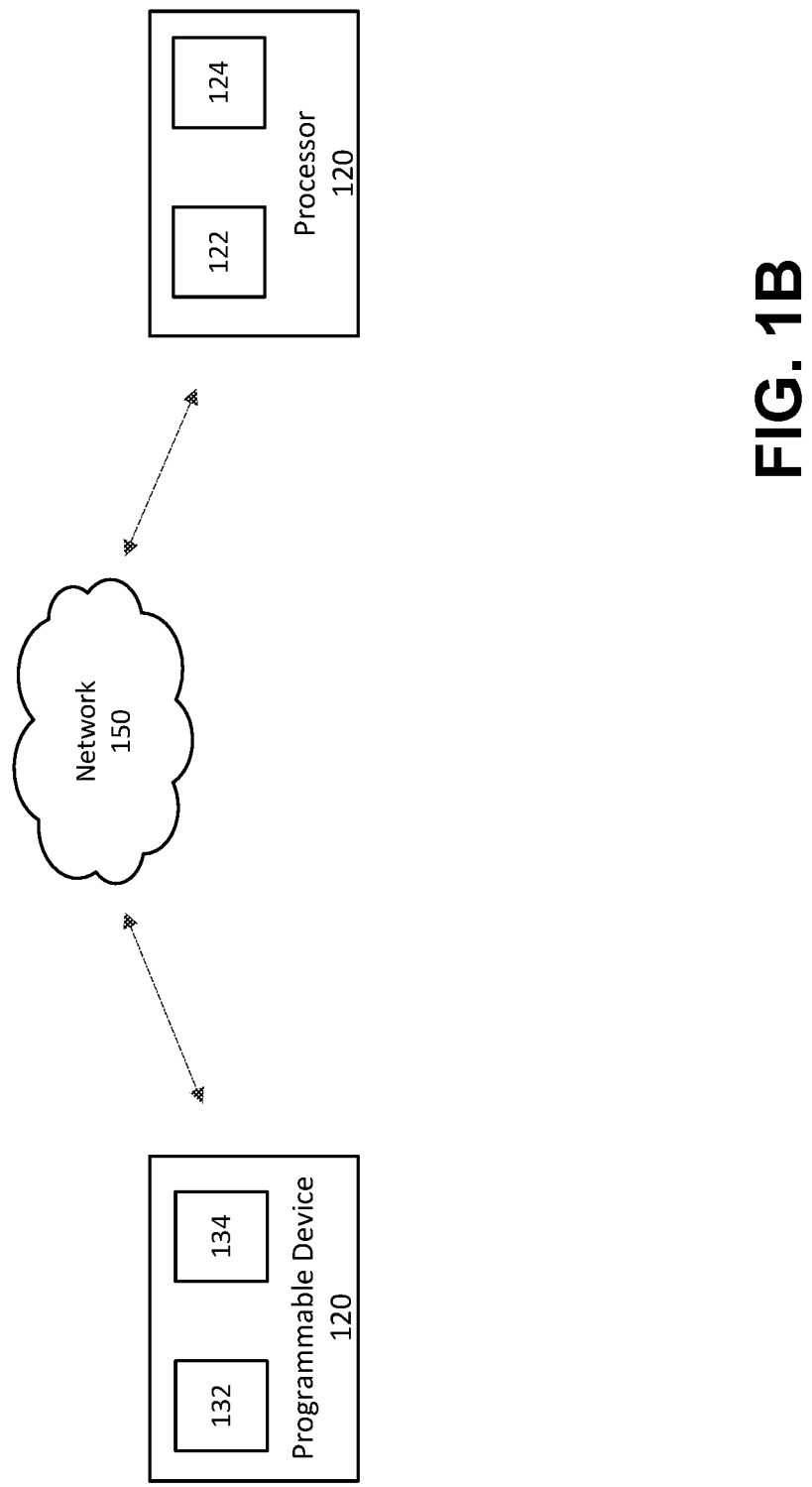
FIG. 1B depicts an example computing environment.

FIG. 1B depicts another computing environment in which processing to perform device pairing and authentication may be employed. As shown in FIG. 1B, processor device 120 and programmable device 130 are communicatively coupled over a network 150. The network 150 may comprise any type of suitable network including, for example, a local area network, a wide area network, and/or a public network such as the Internet. Even in the context of a system environment wherein the devices 120 and 130 are communicatively coupled via a network, the processor device 120 may rely upon the programmable device 130 to perform sensitive operations in a secure manner. Accordingly, the processor device 120 may be configured to pair with the programmable device 130 over network 150 and periodically authenticate that it is, in fact, communicating with and relying on the processing of the intended programmable device 130.

Current authentication techniques, such as certificate exchange, can be costly in both memory usage and computational time. Authentication techniques described herein may be more efficient than current authentication techniques.

Figure 2:
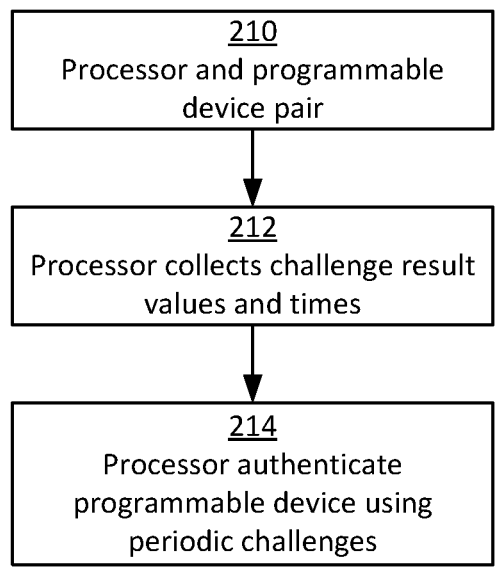
FIG. 2 depicts a flow diagram of example processing for device pairing and authentication.

FIG. 2 depicts a flow diagram of example processing for device pairing and authentication. As shown, at block 210, a first system component, which may be the processor device 120, forms a pairing with a second system component, which may be the programmable device 130. For example, the processor device 120 may receive a unique identifier from the programmable device 130. The processor device 120 forms a pairing with the programmable device 130 by storing the received unique identifier.

The processor device 120, after pairing with the programmable device 130, may perform processing to authenticate that it is, in fact, communicating with the programmable device 130. For example, the processor device 120 may pair with the programmable device 130 only when it is in a known secure environment. At block 212, the processor device 120 may collect responses and response times for challenge messages directed at the programmable device 130. The processor device 120 generates and transmits a series of challenge messages, which may be referred to as test messages, to the programmable device 130. Each challenge message may comprise data that is suitable to be operated on by a cryptographic function. For each received challenge message, the programmable device 130 generates and transmits a reply message comprising a processing result. The processor device 120 may store each reply message including the processing result in relation to the corresponding challenge message. The processor device 120 calculates and stores in relation to each challenge message a processing time value corresponding to the length of time between when the particular challenge message was sent and the corresponding reply message was received.

At block 214, the processor device 120 authenticates that it is communicating with the programmable device 130 with which it was previously paired by periodically communicating a challenge message directed to the programmable device 130. The periodic challenge messages are selected from the series of test challenge messages that were previously communicated and for which expected results and times have been stored. Responsive to receipt of a reply message to the challenge message, the processor device 120 may compare the result comprised in the reply message to the processing result previously stored in relation to the challenge message. The processor device 120 may compare the time elapsed between transmitting the challenge message and the receipt of the reply message to the expected time previously stored in relation to the challenge message. If the received processing result does not correspond to the expected result and/or the processing time does not correspond to the expected time period, the processor device 120 determines that the reply message may not have been received from the programmable device 130 as expected and ceases communicating with the device. If the received processing result does correspond to the expected result and the processing time does correspond to the expected time period, the processor device 120 determines that the reply message has been received from the programmable device 130 as expected and continues communicating with the device 130.

Figure 3:
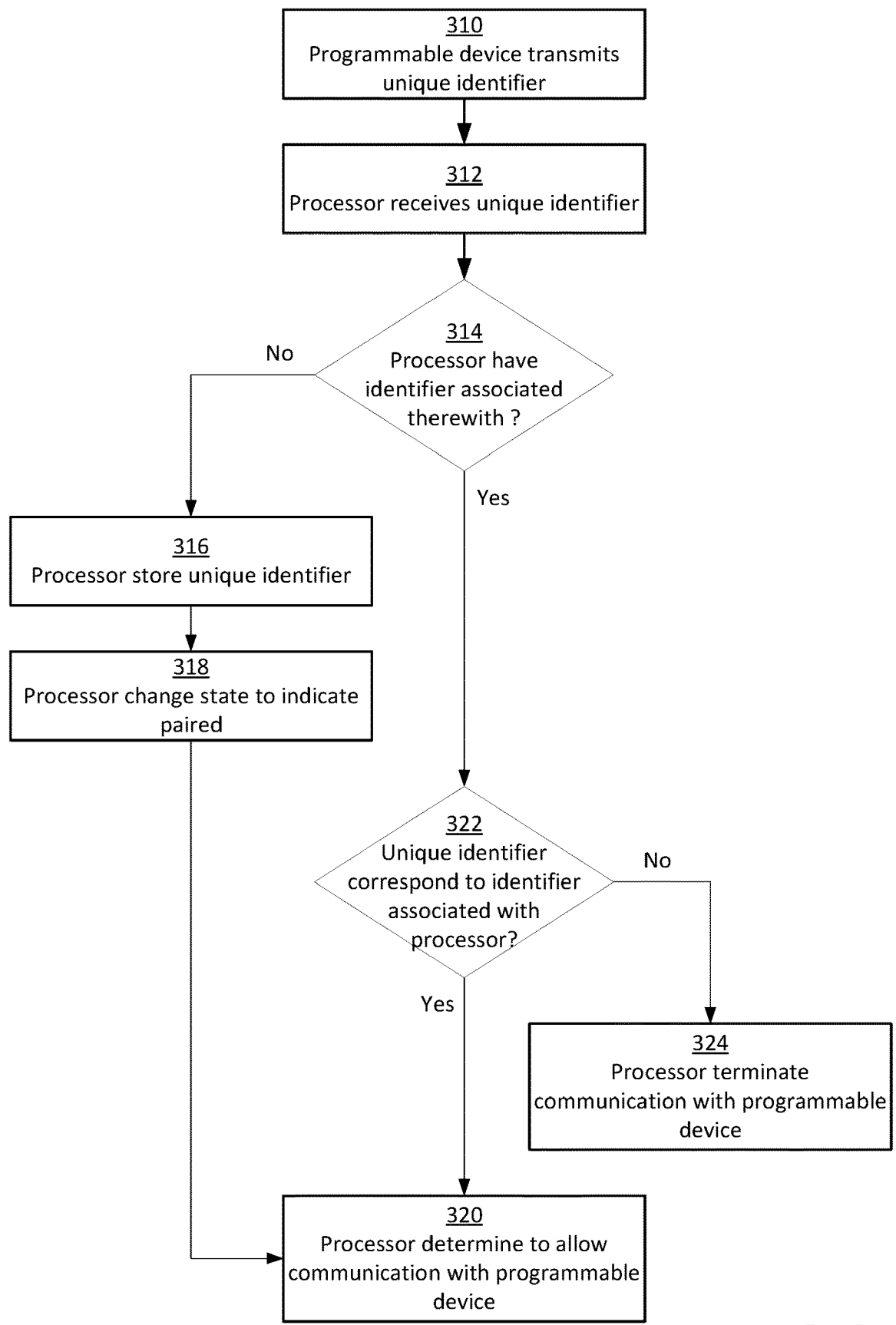
FIG. 3 depicts a flow diagram of example processing for device pairing and authentication.

FIG. 3 depicts a flow diagram of example processing for performing device pairing. Referring to FIG. 3, at block 310, the programmable device 130 may transmit a unique identifier to the processor device 120. The unique identifier may be any data suitable to identify the programmable device 130 such that it may be distinguished from other devices. For example, the unique identifier may be a serial number associated with the programmable device 130. At block 312, the processor device 120 receives the transmitted unique identifier.

At block 314, the processor device 120 may determine if an identifier has previously been associated with the processor device 120. For example, the processor device 120 may determine if it has an identifier corresponding to a second device stored in memory. If not, at block 316, the processor device 120 stores the received unique identifier in memory. For example, the processor device 120 may permanently store the unique identifier in memory by for example, fuse programming. As a further example, the unique identifier may only be stored once, and may only be stored in a known secure operating environment. In connection with storing the unique identifier, at block 318, the processor device 120 may change an internally designated state to indicate it has been paired. At block 320, the processor device 120 determines to allow communication with the programmable device 130 from which the unique identifier was received.

If at block 314, the processor device 120 determines that the processor device 120 already has an identifier associated therewith, processing proceeds to block 322 where the processor device 120 determines if the received unique identifier corresponds to the identifier previously associated with the processor device 120 and stored in its memory. If the processor device 120 determines that the unique identifier does not correspond to the identifier previously associated with the processor device 120, at block 324, the processor device 120 does not continue any communication with the device from which the unique identifier was received. If at block 322, the processor device 120 determines that the received unique identifier does correspond to the identifier previously associated with the processor device 120, at block 320, the processor device 120 determines to allow communication with the programmable device 130 from which the unique identifier was received.

As noted above in connection with block 212 of FIG. 2, after the processor device 120 has paired with the programmable device 130, the processor device 120 collects responses and processing times associated with one or more challenge requests.

Figure 4:
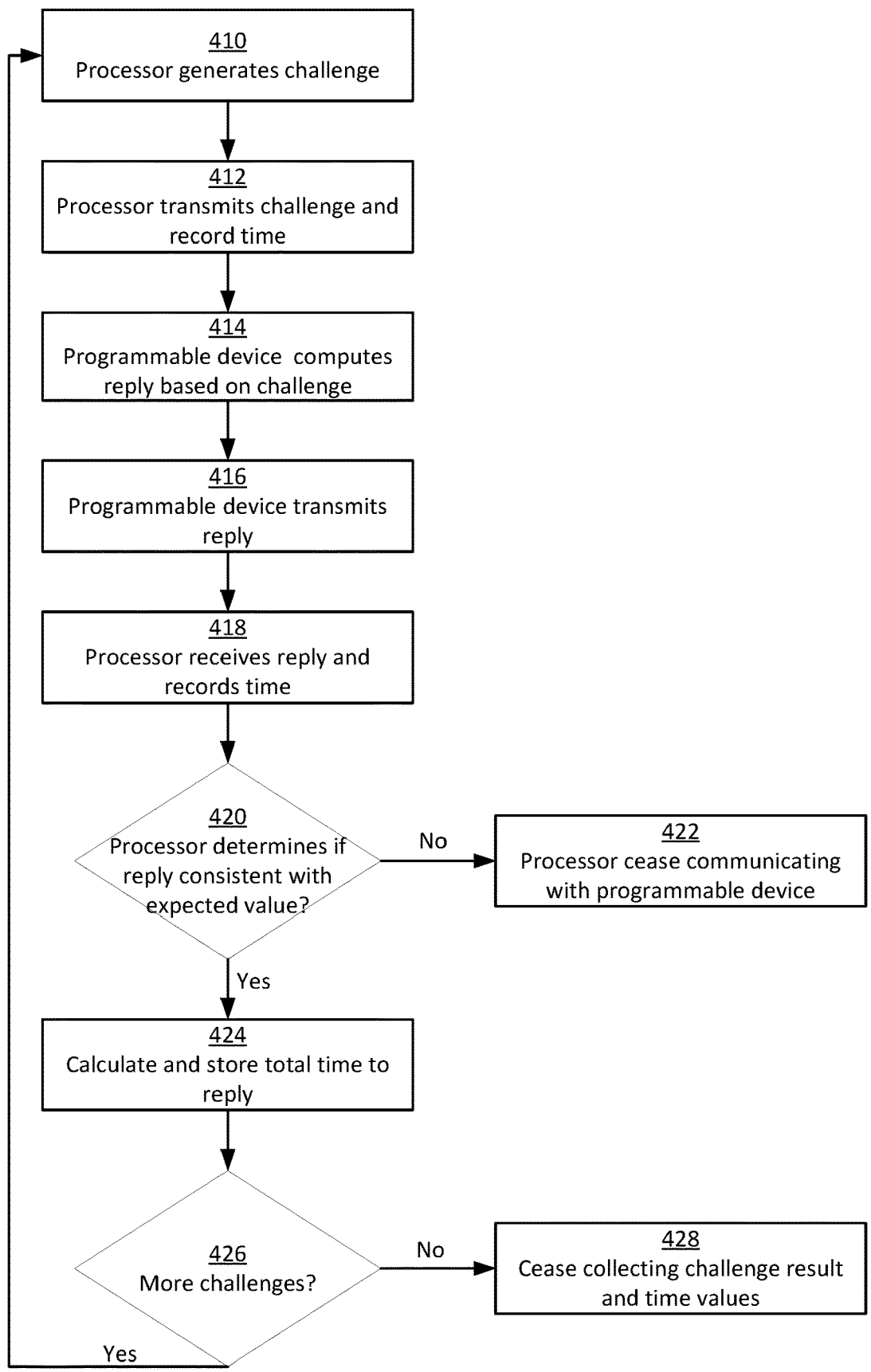
FIG. 4 depicts a flow diagram of example processing for device pairing and authentication.

FIG. 4 depicts a flow diagram of example processing for collecting responses and processing times associated with one or more test challenge requests. Referring to FIG. 4, at block 410, the processor device 120 generates a challenge message. The challenge message may comprise any data suitable for processing by the programmable device 130 to confirm device identity. For example, the challenge message may comprise parameters defining the amount and type of computation that should be performed in response to the challenge request. The parameters may specify a seed value and a work value. The seed value may be a value on which a computation such as a cryptographic computation may be performed. The work value may identify a degree or amount of processing that should be performed on the seed value in connection with generating a result. For example, the work value may identify a number of times, i.e. a count, that the results from the computation performed on the seed value should be looped back through the computation process. If the computation is a cryptographic computation, the work value may identify the number of times or cycles, e.g., 1000 cycles, the cryptographic computation should be run on the seed value. The work value may additionally or alternatively identify an amount of time that the computation should be run. For example, the work value may identify that the computation processing should be performed for 10 ms.

The contents of the challenge message may be encrypted. For example, the seed value and the work value may be encrypted using a cryptographic function that takes a shared secret as a key value. The cryptographic function may be any that is suitable such as, for example, Advanced Encryption Standard (AES) encryption. The shared secret may be any suitable value that is known to both the processor device 120 and the programmable device 130. In an example embodiment, the shared secret may be the unique identifier or a value derived from the unique identifier. For example, the shared secret may be derived by encrypting the unique identifier using a cryptographic algorithm such as Advanced Encryption Standard (AES) using a fixed key value that is known to both the programmable device 130 and processor device 120. If the processor device 120 is a smart card chip, the fixed key may have been loaded by its internal program. If the programmable device 130 is a FPGA device, the fixed key may be included in the FPGA image.

At block 412, the processor device 120 transmits the generated challenge message with encrypted contents to the programmable device 130 and records a time associated with transmitting the challenge message. For example, the processor device 120 may store the time at which the challenge message was transmitted.

At block 414, the programmable device 130 receives the challenge message, decrypts the contents, if necessary, and generates a reply message. If the contents of the challenge message have been encrypted using a shared secret derived from the unique identifier, the programmable device 130 decrypts using the same shared secret. The programmable device 130 generates reply values by performing a computation such as, for example, a cryptographic computation, using the parameter values received in the challenge message. For example, the programmable device 130 may perform a cryptographic function on the seed value received in the challenge message or a value derived from the seed value. Prior to performing the computation, the programmable device 130 may combine the seed value with the programmable device's 130 unique identifier. For example, the programmable device 130 may perform a logical XOR operation combining the seed value with the unique identifier. This additional processing contributes to different programmable devices generating different output results.

The cryptographic computation performed by the programmable device 130 on the seed value, or the modified seed value, may be any suitable computation such as, for example, an AES encryption algorithm or similar computation. In an example scenario, the programmable device 130 may perform the cryptographic computation on a seed value received in the challenge message and may perform the computation consistent with a work value, e.g., loop count or time value, received in the challenge message. For example, the programmable device 130 may use an AES algorithm on the seed value and loop the result back through the AES algorithm for a number of times, e.g. 1000, or for a period of time, e.g., 100 ms, as specified in the challenge message. At block 416, the programmable device 130 transmits a reply message comprising the result of the computation. The programmable device 130 may encrypt the result prior to transmission. For example, the programmable device 130 may encrypt the result value using an AES algorithm with the shared secret as a key value.

At block 418, the processor device 120 receives the reply message and records the time at which the reply was received. If the contents of the reply message are encrypted, the processor device 120 decrypts the contents using the suitable encryption algorithm and shared secret.

At block 420, the processor device 120 determines if the result value comprised in the reply message is consistent with data and time expected values. For example, the processor device 120 may calculate a result of the same computation on the same seed value as is expected to be performed by the programmable device 130. The processor device 120 compares the result that it calculated with the result received in the reply message. If the calculated result does not match the received result, at block 422, the processor device 120 determines the device from which the reply message was received is not suitable and ceases communication with the device. Even during this training, the time may be compared to hard coded laboratory stored times to ensure that the device is not being tampered with during training. The training process may be used to characterize the network communication latency so that the design may be incorporated into a different application, even on a single circuit board. For example, the communication channel may be a direct serial bus, such as I²C, or something much more complicated such as SmartCard 7816-based protocol stack.

If at block 420, the processor device 120 determines that the calculated computation result matches the received result, at block 424, the processor device 120 calculates and stores the time difference between when the challenge was transmitted and the reply message was received. In other words, the processor device 120 calculates and stores the time interval between transmitting the challenge message and receiving the reply message. The processor device 120 stores the time interval in relation to information specifying the particular challenge to which the interval applies. For example, the processor device 120 may store the determined time period value and received result value in relation to the seed value and the work value of the particular challenge message. The processor device 120 additionally stores the result value that was received in the reply message.

The processor device 120 may store a collection or database of challenge messages and corresponding expected result values and expected response times. The processor device 120 may use the collection of challenge data in making periodic authentications of the programmable device 130. At block 426, the processor device 120 determines if additional training challenge messages should be generated in order to build the database of challenge messages. A collection of expected results and expected response times for challenge seed values may be desirable in order to provide a variety of potential challenges that may be used for periodic challenges. If additional challenge messages are needed, processing continues at block 410 with the processor device 120 generating a new challenge message. If at block 426 additional challenges to develop a database of values is not desired or needed, the processor device 120 ceases collecting challenge messages and expected results and processing times at block 428. The database may allow for the calculation of the expected response time for a new challenge message that has not been used previously. For example, with times from work values of 100 and 1000, given a cryptographic computation process that is linear, it may be possible to predict the time it takes for a work value of 2500. The calculation would be $(T_{1000}-T_{100})$ divided by 900, multiplied by 2400 and added with $T_{100}$ again. Of course, the calculation may be more complicated for non-linear cryptographic functions. This may allow messages that have not been used before to be employed for authentication, thereby avoiding an attacker storing such messages for playback attacks later.

After storing the database of challenges with seed and work values and corresponding expected results and response times, processor device 120 periodically communicates challenges with seed values that it has tested and stored to the programmable device 130 in order to authenticate that it is communicating with the programmable device as intended.

Figure 5:
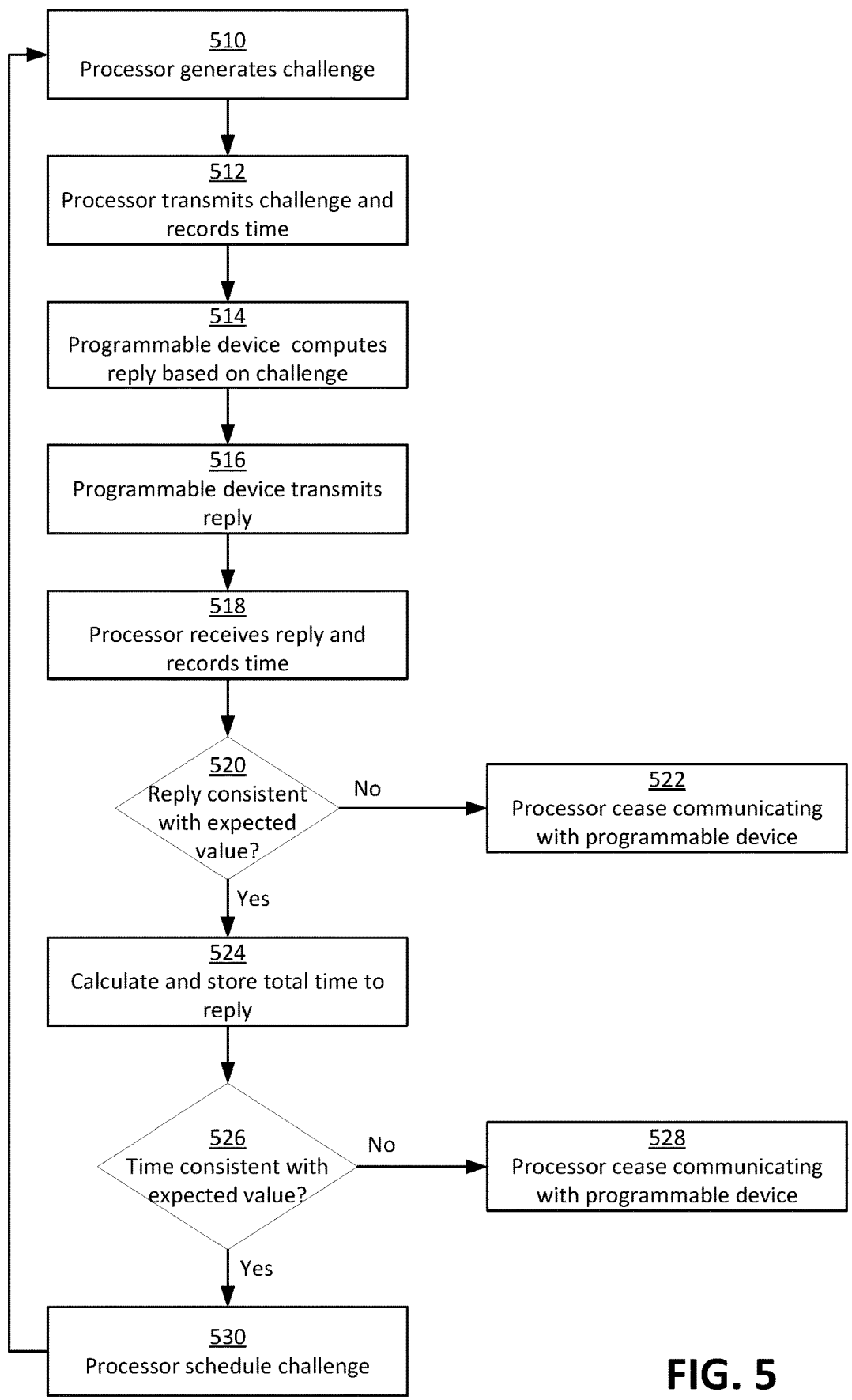
FIG. 5 depicts a flow diagram of example processing for device pairing and authentication.

FIG. 5 depicts a flow diagram of example processing for performing periodic authentication. As shown, at block 510, the processor device 120 generates a challenge message. The processor device 120 may select one of the challenges with seed and work values that were previously issued and for which an expected result and processing time have been determined and stored. In other words, the processor device 120 may select a challenge for which it has previously determined an expected result and time value.

The challenge message may comprise any data suitable for processing by the programmable device 130 to confirm device identity. For example, the challenge message may comprise parameters defining the amount and type of computation that should be performed in response to the challenge request. The parameters may specify a seed value and a work value. The seed value may be a value on which a computation such as a cryptographic computation may be performed. The work value may identify a degree or amount of processing that should be performed on the seed value in connection with generating a result. For example, the work value may identify a number of times, i.e., a count, that the results from the computation performed on the seed value should be looped back through the computation process. If the computation is a cryptographic computation, the work value may identify the number of times or cycles, e.g., 1000 cycles, the cryptographic computation should be run on the seed value. The work value may additionally or alternatively identify an amount of time that the computation should be run. For example, the work value may identify that the computation processing should be performed for 100 ms. Time based authentication may generate results that are linearly correlated. This may be done, for example, by adding 1 for each cycle. If the challenge specifies, for example, a starting value of 1000, and runs for 100 cycles, the result would be 1100 if each cycle takes 1 ms. This way, it may be possible to evaluate the closeness of the received reply with the expected standard value to allow a certain amount of timing variance for reliable operations.

The contents of the challenge message may be encrypted. For example, the seed value and the work value may be encrypted using a cryptographic function that takes a shared secret as a key value. The cryptographic function may be any that is suitable such as, for example, AES encryption. The shared secret may be any suitable value that is known to both the processor device 120 and the programmable device 130. In an example embodiment, the shared secret may be the unique identifier or a value derived from the unique identifier. For example, the shared secret may be derived by encrypting the unique identifier using a cryptographic algorithm such as AES using a fixed key value that is known to both the programmable device 130 and processor device 120. If the processor device 120 is a smart card chip, the fixed key may have been loaded by its internal program. If the programmable device 130 is a FPGA device, the fixed key may be included in the FPGA image.

At block 512, the processor device 120 transmits the challenge message with encrypted contents to the programmable device 130 and records a time associated with transmitting the challenge message. For example, the processor device 120 may store the time at which the challenge message was transmitted.

At block 514, the programmable device 130 receives the challenge message, decrypts the contents, if necessary, and generates a reply message. If the contents of the challenge message have been encrypted using a shared secret derived from the unique identifier, the programmable device 130 decrypts using the same shared secret. The programmable device 130 generates reply values by performing a computation such as, for example, a cryptographic computation, using the parameter values received in the challenge message. For example, the programmable device 130 may perform a cryptographic function on the seed value received in the challenge message or a value derived from the seed value. Prior to performing the computation, the programmable device 130 may combine the seed value with the programmable device's 130 unique identifier. For example, the programmable device 130 may perform a logical XOR operation combining the seed value with the unique identifier. This additional processing contributes to different programmable devices generating different output results.

The cryptographic computation performed by the programmable device 130 on the seed value, or the modified seed value, may be any suitable computation such as, for example, an AES encryption algorithm or similar computation. In an example scenario, the programmable device 130 may perform the cryptographic computation on a seed value received in the challenge message and may perform the computation consistent with a work value, e.g., loop count or time value, received in the challenge message. For example, the programmable device 130 may use an AES algorithm on the seed value and loop the result back through the AES algorithm for a number of times, e.g. 1000, or for a period of time, e.g., 100 ms, as specified in the challenge message. AES algorithms may not be suitable for timed operations as each cycle could take very little time to perform but generate entirely different values if the number of cycles could not be controlled exactly. Any timing variation in the communication process may result in false positives leading to unintended authentication failure.

At block 516, the programmable device 130 transmits a reply message comprising the result of the computation. The programmable device 130 may encrypt the result prior to transmission. For example, the programmable device 130 may encrypt the result value using an AES algorithm with the shared secret as a key value.

At block 518, the processor device 120 receives the reply message and records the time at which the reply was received. If the contents of the reply message are encrypted, the processor device 120 decrypts the contents using the suitable encryption algorithm and shared secret.

At block 520, the processor device 120 determines if the result value comprised in the reply message is consistent with an expected result value. For example, the processor device 120 may retrieve from memory the expected result that was previously determined and stored in relation to the particular challenge request that was transmitted to the programmable device 130. The processor device 120 compares the expected result that it retrieved from memory with the result received in the reply message. If the expected result does not match the received result, at block 522, the processor device 120 determines the device from which the reply message was received is not the expected device and ceases communication with the device.

If at block 520, the processor device 120 determines that the expected result matches the received result, at block 524, the processor device 120 calculates and stores the time difference between when the challenge was transmitted and the reply message was received. In other words, the processor device 120 calculates and stores the amount of time the programmable device 130 used to generate the reply message.

At block 526, the processor device 120 determines if the time interval between transmitting the challenge and receiving the reply corresponds to the expected time value that was previously determined and stored in relation to the particular challenge message. If the time value determined for the reply message does not correspond to the retrieved expected reply, at block 528, the processor device 120 determines the device from which the reply message was received is not the expected device and ceases communication with the device.

If at block 526, the processor device 120 determines that the time value determined for the reply message corresponds to the retrieved expected reply, at block 530, the processor device 120 determines it is communicating with the programmable device 130 as intended and schedules a next periodic authentication challenge of the programmable device 130. For example, the processor device 120 may determine that it should generate another authentication challenge in 100 ms. Processing continues at block 510 and another challenge request is generated.

Figure 6:
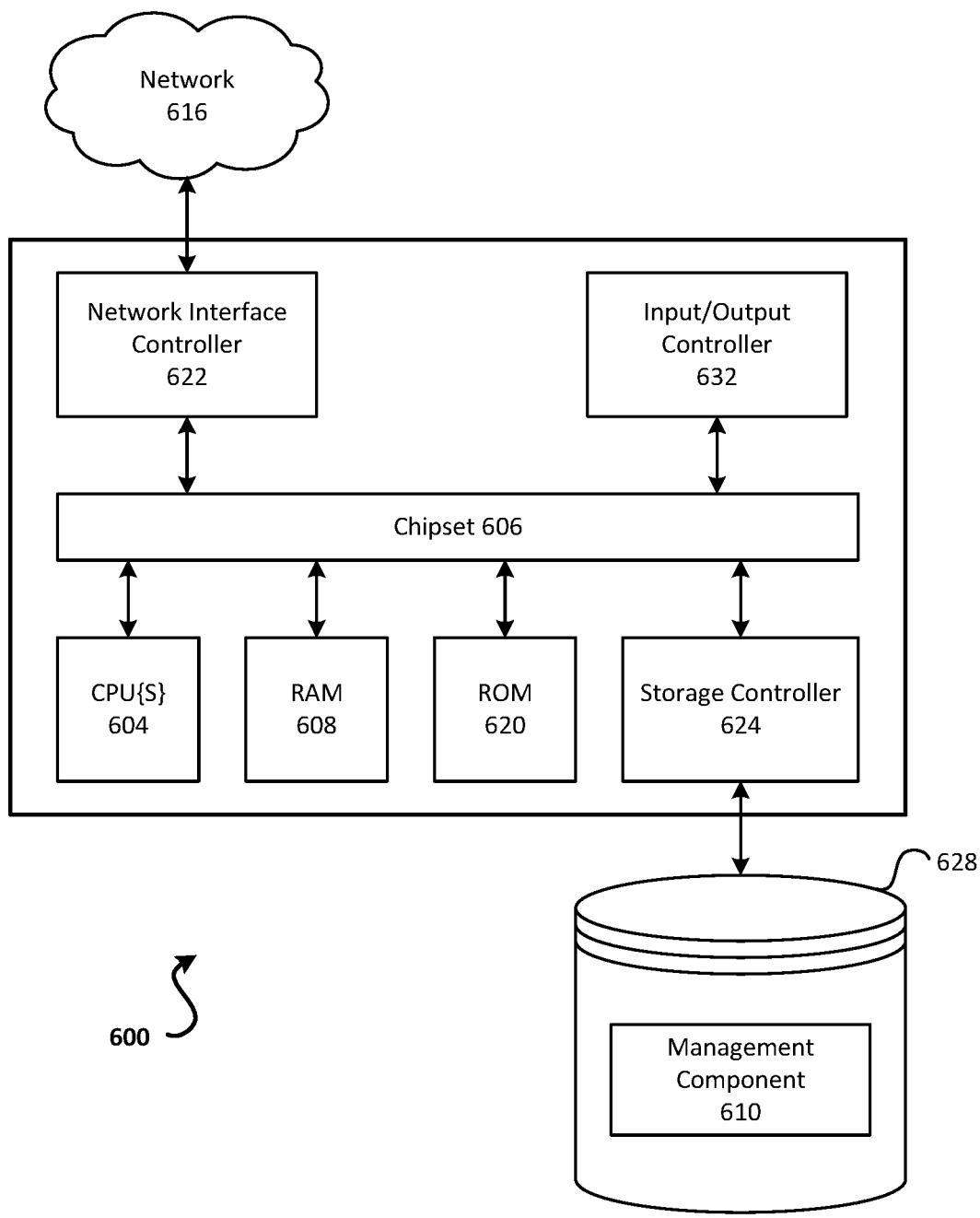
FIG. 6 depicts an example computing system.

In the description accompanying FIGS. 2, 3, and 4, processing for device pairing and authentication is described in the context of processing by processor device 120 and programmable device 130. It will be appreciated that the described processes may be performed by any suitable system components including, for example, by discrete computing systems that communicate over a communications link. FIG. 6 depicts an example computer architecture for a computing system 600 capable of executing software for performing operations as described above in connection with FIGS. 2-4. The computer architecture shown in FIG. 6 illustrates a conventional server computer, workstation, desktop computer, laptop, tablet, network appliance, PDA, e-reader, digital cellular phone, or other computing node, and may be utilized to execute any aspects of the software components presented herein.

Computer 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. CPUs 604 may be standard programmable processors that perform arithmetic and logical operations necessary for the operation of computer 600.

CPUs 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 606 may provide an interface between CPUs 604 and the remainder of the components and devices on the baseboard. Chipset 606 may provide an interface to a random access memory (RAM) 508 used as the main memory in computer 600. Chipset 606 may further provide an interface to a computer-readable storage medium, such as a read-only memory (ROM) 620 or non-volatile RAM (NVRAM) (not shown), for storing basic routines that may help to start up computer 600 and to transfer information between the various components and devices. ROM 620 or NVRAM may also store other software components necessary for the operation of computer 600 in accordance with the embodiments described herein.

Computer 600 may operate in a networked environment using logical connections to remote computing nodes and computer systems through LAN 616. Chipset 606 may include functionality for providing network connectivity through a network interface controller (NIC) 622, such as a gigabit Ethernet adapter. NIC 622 may be capable of connecting the computer 600 to other computing nodes over LAN 616. It should be appreciated that multiple NICs 622 may be present in computer 600, connecting the computer to other types of networks and remote computer systems.

Computer 600 may be connected to a mass storage device 628 that provides non-volatile storage for the computer. Mass storage device 628 may store system programs, application programs, other program modules, and data, which have been described in greater detail herein. Mass storage device 628 may be connected to computer 600 through a storage controller 624 connected to chipset 606. Mass storage device 628 may consist of one or more physical storage units. Storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 600 may store data on mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 628 is characterized as primary or secondary storage and the like.

For example, computer 600 may store information to mass storage device 628 by issuing instructions through storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 600 may further read information from mass storage device 628 by detecting the physical states or characteristics of one or more particular locations within the physical storage units.

In addition to mass storage device 628 described above, computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 600.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 628 may store an operating system utilized to control the operation of the computer 600. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 628 may store other system or application programs and data utilized by computer 600, such as management component 610 and/or the other software components described above.

Mass storage device 628 or other computer-readable storage media may also be encoded with computer-executable instructions, which, when loaded into computer 600, transforms the computer from a general-purpose computing system into a special-purpose computer capable of implementing the embodiments described herein. These computer-executable instructions transform computer 600 by specifying how CPUs 604 transition between states, as described above. Computer 600 may have access to computer-readable storage media storing computer-executable instructions, which, when executed by computer 600, may perform operating procedures described above in connection with FIGS. 2-4.

Computer 600 may also include an input/output controller 632 for receiving and processing input from a number of input devices, such as a keyboard, a mouse, a touchpad, a touch screen, an electronic stylus, or other type of input device. Similarly, input/output controller 632 may provide output to a display, such as a computer monitor, a flat-panel display, a digital projector, a printer, a plotter, or other type of output device. It will be appreciated that computer 600 may not include all of the components shown in FIG. 6, may include other components that are not explicitly shown in FIG. 6, or may utilize an architecture completely different than that shown in FIG. 6.

Accordingly, systems and methods have been described that provide device pairing and authentication. The described systems and methods allow for devices to confirm that communications are being performed with, and processing provided by, an intended device. It will be appreciated that while example embodiments have been described in the context of devices that perform sensitive or secure processing, the intended embodiments extend to devices or components that perform processing for any suitable purpose.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been described, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the described processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from or rearranged compared to the described example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions described herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions described herein. The accompanying claims and their equivalents are intended to cover such forms or modifications as would fall within the scope and spirit of certain of the inventions described herein.

What is claimed:

1. A method implemented in a first device, the method comprising:
   transmitting, to a second device, a challenge message;
   receiving a reply message;
   comparing a length of time between transmitting the challenge message and receiving the reply message, to at least one other length of time between transmitting a prior challenge message and receiving a prior reply message;
   determining, based on the reply message, and based on the comparing the length of time to the at least one other length of time, whether the reply message was received from the second device; and
   communicating, based on determining that the reply message was received from the second device, with the second device.

2. The method of claim 1, further comprising:
   ceasing, based on determining that the reply message was not received from the second device, communication with the second device.

3. The method of claim 1, further comprising:
   sending, to the second device, a plurality of test messages;
   receiving, from the second device, a test result for each of the plurality of test messages; and
   storing, for each of the plurality of test messages, a received test result and a length of time associated with the test result, wherein the prior challenge message corresponds to a given one of the plurality of test messages and the prior reply message corresponds to a given one of the test results.

4. The method of claim 3,
wherein the transmitted challenge message comprises a selected one of the plurality of test messages; and
wherein determining that the reply message was received from the second device comprises determining that the length of time between transmitting the challenge message and receiving the reply message corresponds to the length of time stored for the selected one of the plurality of test messages.

5. The method of claim 1, further comprising:
receiving a unique identifier;
determining whether the first device has an associated identifier; and
if the first device does not have an associated identifier,
storing the received unique identifier, and
changing a status identifier to indicate that the second device is paired.

6. The method of claim 1,
wherein the challenge message comprises a seed, and
wherein determining that the reply message was received from the second device comprises determining that the reply message comprises a value corresponding to an expected output from a cryptographic function operating on the seed.

7. The method of claim 1,
wherein the challenge message comprises information for performing a cryptographic calculation, and
wherein determining that the reply message was received from the second device comprises determining that the reply message comprises an expected value from performing the cryptographic calculation.

8. A method implemented in a first device, the method comprising:
transmitting, to a second device, a challenge message including information for performing a calculation;
receiving a reply message comprising a result of the calculation performed using the information by the second device;
comparing a length of time between transmitting the challenge message and receiving the reply message, to at least one other length of time between transmitting a prior challenge message and receiving a prior reply message;
determining, based on the result and the comparing the length of time to the at least one other length of time, that the reply message was received from the second device; and
communicating, based on determining that the reply message was received from the second device, with the second device.

9. The method of claim 8, further comprising:
ceasing, based on determining that the reply message was not received from the second device, communication with the second device.

10. The method of claim 8, further comprising:
receiving, from the second device, a unique identifier; and
storing the unique identifier.

11. The method of claim 10,
wherein receiving the unique identifier and storing the unique identifier comprises receiving the unique identifier and storing the unique identifier when the first device and the second device are in a secure environment.

12. The method of claim 10, further comprising:
deriving a shared secret from the unique identifier;
encrypting the challenge message using the shared secret; and
decrypting the reply message using the shared secret.

13. The method of claim 8,
wherein the information is for performing a cryptographic calculation,
wherein the second device performs the cryptographic calculation using the information to generate the result, and
wherein determining that the reply message was received from the second device comprises determining that the result is an expected value from performing the cryptographic calculation using the information.

14. The method of claim 8,
wherein the first device has stored an expected result and an expected processing time for the challenge message, and
wherein determining that the reply message was received from the second device comprises determining that the result corresponds to the expected result and determining that the length of time between transmitting the challenge message and receiving the reply message corresponds to the expected processing time.

15. A device comprising:
one or more processors; and
a memory storing computer executable instructions that, when executed by the one or more processors, cause the device to:
transmit, to an other device, a challenge message;
receive a reply message;
compare a length of time between transmitting the challenge message and receiving the reply message, to at least one other length of time between transmitting a prior challenge message and receiving a prior reply message;
determine, based on the reply message and the comparing the length of time to the one or more other lengths of time, whether the reply message was received from the other device; and
communicate, based on determining that the reply message was received from the other device, with the other device.

16. The device of claim 15, wherein the instructions, when executed, further cause the device to:
cease, based on determining that the reply message was not received from the other device, communication with the other device.

17. The device of claim 15, wherein the instructions, when executed, further cause the device to:
send, to the other device, a plurality of test messages;
receive, from the other device, a test result for each of the plurality of test messages; and
store, for each of the plurality of test messages, a received test result and a length of time associated with the test result,
wherein the prior challenge message corresponds to a given one of the plurality of test messages and the prior reply message corresponds to a given one of the test results.

18. The device of claim 17,
wherein the transmitted challenge message comprises a selected one of the plurality of test messages; and
wherein determining that the reply message was received from the other device comprises determining that the length of time between transmitting the challenge message and receiving the reply message corresponds to the length of time stored for the selected one of the plurality of test messages.

19. The device of claim 15,
wherein the challenge message comprises information for performing a cryptographic calculation, and
wherein determining that the reply message was received from the other device comprises determining that the reply message comprises an expected value from performing the cryptographic calculation.

20. A device comprising:
one or more processors; and
memory storing computer executable instructions that, when executed by the one or more processors, cause the device to:
transmit, to an other device, a challenge message including information for performing a calculation;
receive a reply message comprising a result of the calculation performed using the information by the second device;
compare a length of time between transmitting the challenge message and receiving the reply message, to at least one other length of time between transmitting a prior challenge message and receiving a prior reply message;
determine, based on the result and the comparing the length of time to the one or more other lengths of time, that the reply message was received from the other device; and
communicate, based on determining that the reply message was received from the other device, with the other device.

21. The device of claim 20, wherein the instructions, when executed, further cause the device to:
cease, based on determining that the reply message was not received from the other device, communication with the other device.

22. The device of claim 20, wherein the instructions, when executed, further cause the device to:
receive, from the other device, a unique identifier; and
store the unique identifier.

23. The device of claim 22,
wherein receiving the unique identifier and storing the unique identifier comprises receiving the unique identifier and storing the unique identifier when the device and the other device are in a secure environment.

24. The device of claim 22, wherein the instructions, when executed, further cause the device to:
derive a shared secret from the unique identifier;
encrypt the challenge message using the shared secret; and
decrypt the reply message using the shared secret.

* * * * *